United States Patent
Qian et al.

(10) Patent No.: US 10,782,858 B2
(45) Date of Patent: Sep. 22, 2020

(54) EXTENDED REALITY INFORMATION FOR IDENTIFIED OBJECTS

(71) Applicant: Lenovo (Singapore) Pte. Ltd., Singapore (SG)

(72) Inventors: Ming Qian, Cary, NC (US); Song Wang, Cary, NC (US); Jian Li, Chapel Hill, NC (US); Jianbang Zhang, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/273,731

(22) Filed: Feb. 12, 2019

(65) Prior Publication Data

US 2020/0257484 A1 Aug. 13, 2020

(51) Int. Cl.
*G06F 3/0484* (2013.01)
*G06F 3/14* (2006.01)
*G06F 16/29* (2019.01)
*G06F 3/01* (2006.01)
*G06T 19/00* (2011.01)
*H04N 21/234* (2011.01)
*H04N 21/472* (2011.01)

(52) U.S. Cl.
CPC ............ *G06F 3/0484* (2013.01); *G06F 3/013* (2013.01); *G06F 3/14* (2013.01); *G06F 16/29* (2019.01); *G06T 19/00* (2013.01); *H04N 21/23412* (2013.01); *H04N 21/47205* (2013.01)

(58) Field of Classification Search
None
See application file for complete search history.

(56) References Cited

U.S. PATENT DOCUMENTS

| | | | | |
|---|---|---|---|---|
| 9,830,395 | B2 * | 11/2017 | Mullins | G06F 16/9537 |
| 2009/0097705 | A1 * | 4/2009 | Thorn | G06Q 10/02 382/103 |
| 2013/0335310 | A1 * | 12/2013 | Whitney | G06F 3/012 345/156 |
| 2016/0133051 | A1 * | 5/2016 | Aonuma | G06T 19/006 345/633 |

* cited by examiner

*Primary Examiner* — Jwalant Amin
(74) *Attorney, Agent, or Firm* — Ference & Associates LLC

(57) ABSTRACT

One embodiment provides a method, including: receiving, at an information handling device, an indication to display extended reality content; determining, using a processor, a user's geographic position in an area; accessing, from an accessible storage location, map data associated with the area; identifying, using at least one sensor associated with the information handling device, a user's line of sight; determining, based on the user's geographic position and the map data, an object associated with the user's line of sight; determining, using a processor, an identity of the object; and displaying the extended-reality content for the identified object in a field of view of the information handling device. Other aspects are described and claimed.

17 Claims, 3 Drawing Sheets

EXTENDED REALITY INFORMATION FOR IDENTIFIED OBJECTS

BACKGROUND

Advances in technology have led to the development of information handling devices ("devices"), for example smart phones, tablet devices, head-mounted wearable headsets, and the like, capable of displaying a variety of different types of extended reality ("XR") content such as augmented reality ("AR") content, mixed reality ("MR") content, virtual reality ("VR") content, a combination thereof, and the like. These XR-enabled devices may provide an overlay of virtual elements onto a live view of a physical, real-world environment. The virtual elements may be spatially registered with the physical world so that the virtual elements may be perceived as an immersive aspect of the physical world.

BRIEF SUMMARY

In summary, one aspect provides a method, comprising: receiving, at an information handling device, an indication to display extended reality content; determining, using a processor, a user's geographic position in an area; accessing, from an accessible storage location, map data associated with the area; identifying, using at least one sensor associated with the information handling device, a user's line of sight; determining, based on the user's geographic position and the map data, an object associated with the user's line of sight; determining, using a processor, an identity of the object; and displaying the extended-reality content for the identified object in a field of view of the information handling device.

Another aspect provides an information handling device, comprising: at least one sensor; a processor; a memory device that stores instructions executable by the processor to: receive an indication to display extended reality content; determine a user's geographic position in an area; access, from an accessible storage database, map data associated with the area; identify a user's line of sight; determine, based on the user's geographic position and the map data, an object associated with the user's line of sight; determine an identity of the object; and display the extended content for the identified object in a field of view of the information handling device.

A further aspect provides a product, comprising: a storage device that stores code, the code being executable by a processor and comprising: code that receives an indication to display extended reality content; code that determines a user's geographic position in an area; code that accesses map data associated with the area; code that identifies a user's line of sight; code that determines, based on the user's geographic position and the map data, an object associated with the user's line of sight; code that determines an identity of the object; and code that displays the extended reality content for the identified object.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
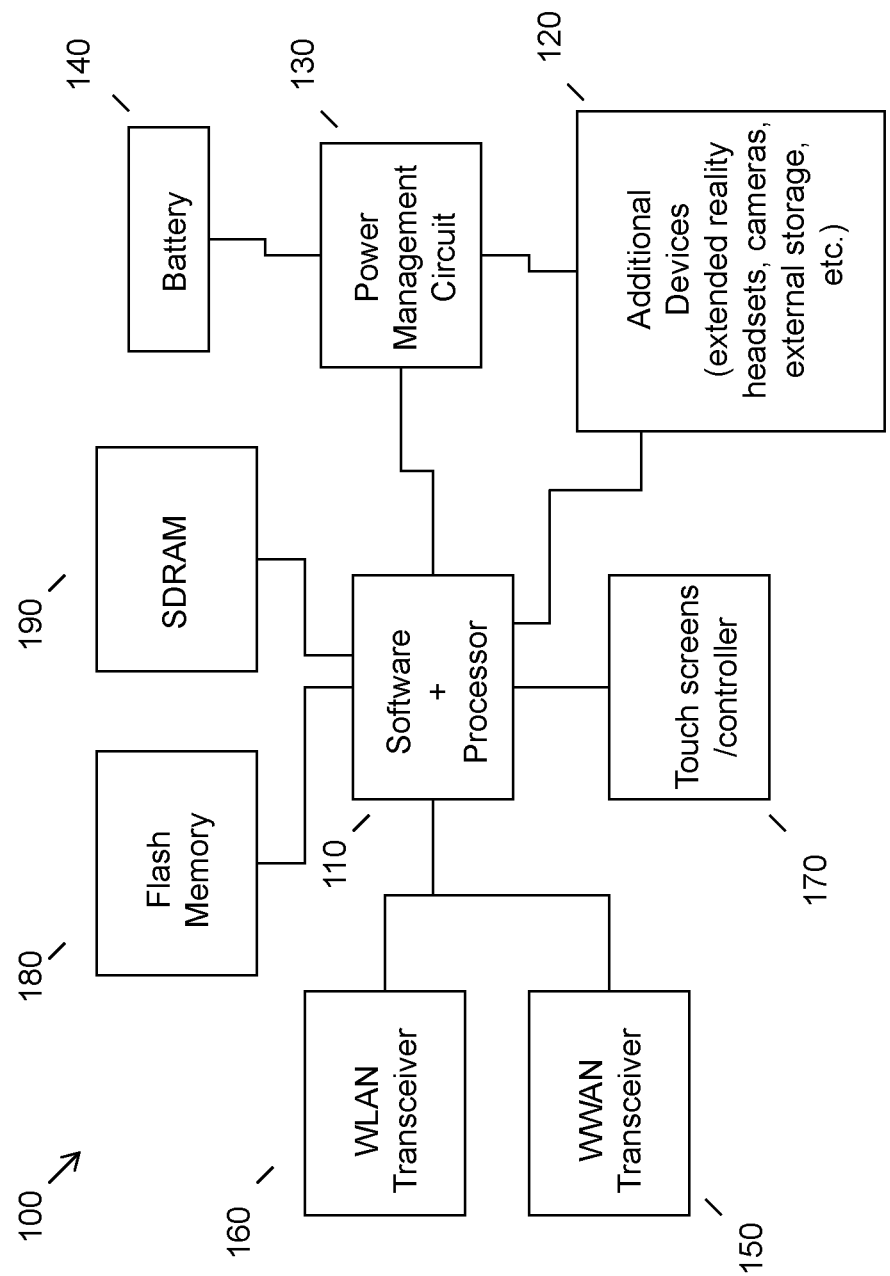
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Individuals may desire to obtain additional information regarding certain objects in their surroundings. For example, a tourist visiting a city for the first time may wish to obtain additional information (e.g., historical information, structural information, etc.) about buildings, monuments, statues, and the like that they see in the city. Advances in technology have enabled users to search for this information on their mobile device (e.g., using a search engine on their smart phone, tablet, other electronic device, etc.). However, such a method requires a user to provide explicit search input to the device, which requires additional effort from the user and may be time-consuming. Additionally, if the user does not know the name of the object, or cannot describe a defining characteristic of the object, conducting a search for information about the object may be difficult and time-consuming.

An alternative method of receiving information about an object is to utilize a device that can automatically identify objects proximate to a user and thereafter provide informative output associated with those objects. For example, a head-mounted display (HMD) may be worn by a user that can display information about proximate objects in mixed or augmented reality. Such a device may utilize global positioning system (GPS) sensors integrated into the HMD to identify a user's geographic position. The device may also access map data, or GPS data associated with other objects, to identify the geographic positions of surrounding objects. The device may then utilize this information to determine whether a user is within a threshold distance from an object. Responsive to determining that the user is within a threshold distance from an object, the device may automatically provide information about that object.

Although the foregoing method has its advantages over manual user search attempts, it is still wrought with a variety of issues. For instance, in a situation where an object-of-interest is far away from the user, geographic position sensors alone would not be able to accurately identify the distant object, especially if the object-of-interest is positioned among a plurality of other objects. In another situation, if a user is standing proximate to a plurality of objects, the device may not know which object to provide information on because a user may be within a threshold distance from a plurality of objects.

Accordingly, an embodiment provides a method for displaying information about an object a user is looking at in their device's field of view. In an embodiment, an indication may be received by an extended reality-capable device to display content associated with an object. The indication may result from a user-provided command to display information (e.g., a gesture command, a verbal command, etc.). Alternatively, the indication may be generated responsive to positively identifying an object the user is looking at. In order to accurately identify the object, an embodiment may collect various types of information associated with the user's contextual situation. For example, an embodiment may determine a user's geographic position in an area (e.g., using GPS data, etc.), an embodiment may access map data associated with the area, and an embodiment may identify a user's line of sight by using one or more sensors. An embodiment may thereafter utilize this combined information to accurately determine the object the user is looking. Responsive to making this determination, an embodiment may display extended reality content about the object in a field of view of the device. For example, an embodiment may display historical information about a building in a space in the device's field of view that overlaps the building. Such a method may more accurately identify objects users are interested in, enabling the user to receive relevant information about those objects.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, a thermal sensor, etc. System 100 often includes one or more touch screens 170 for data input and display/rendering. System 100 also typically includes various memory devices, for example flash memory 180 and SDRAM 190.

Figure 2:
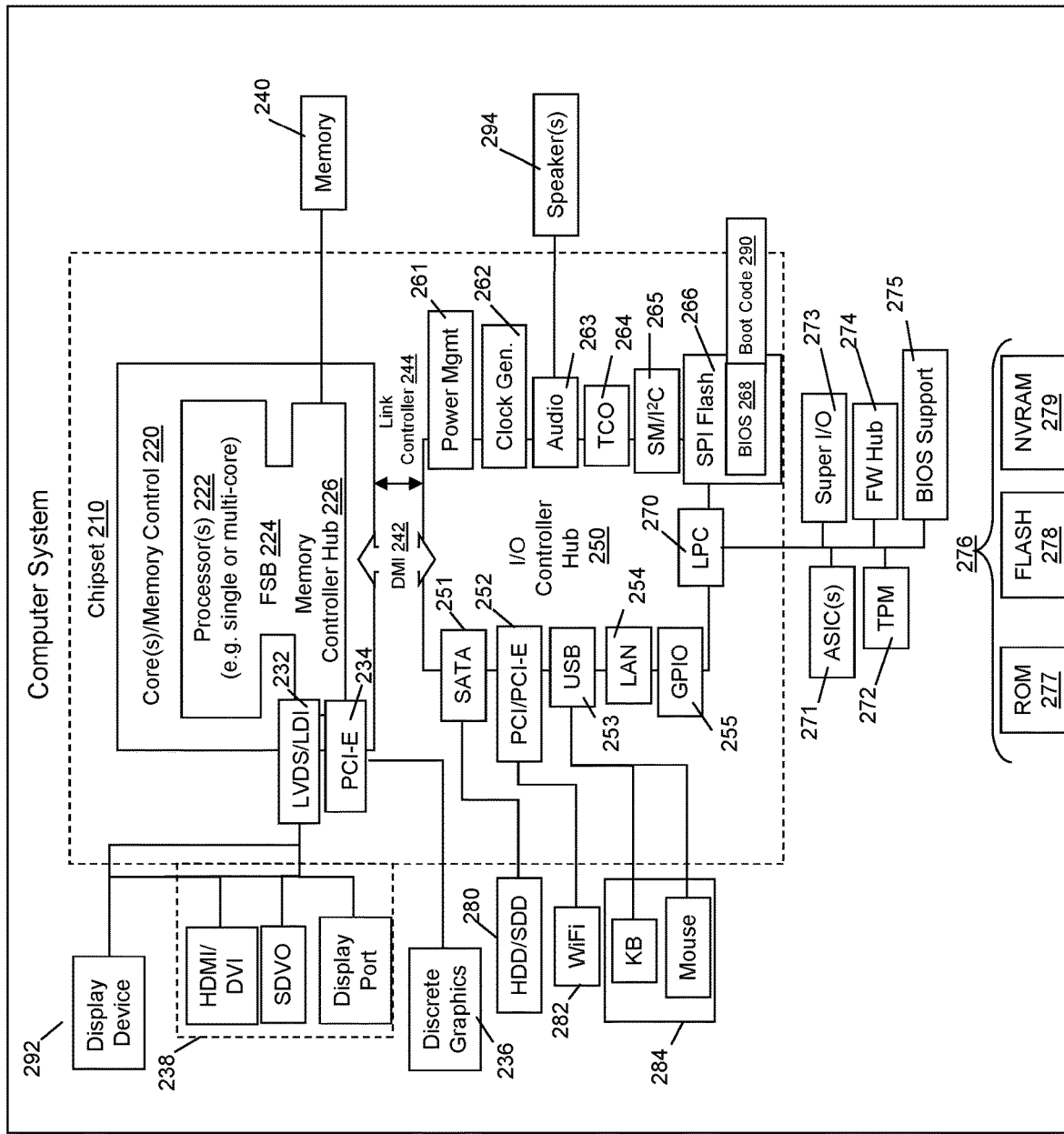
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, AR or MR capable HMDs, personal computer devices generally, and/or electronic devices that are capable of capturing worldview image data and displaying AR or MR content on one or more display screens of the device. For example, the circuitry outlined in FIG. 1 may be implemented in a tablet or smart phone embodiment, whereas the circuitry outlined in FIG. 2 may be implemented in an HMD embodiment.

Figure 3:
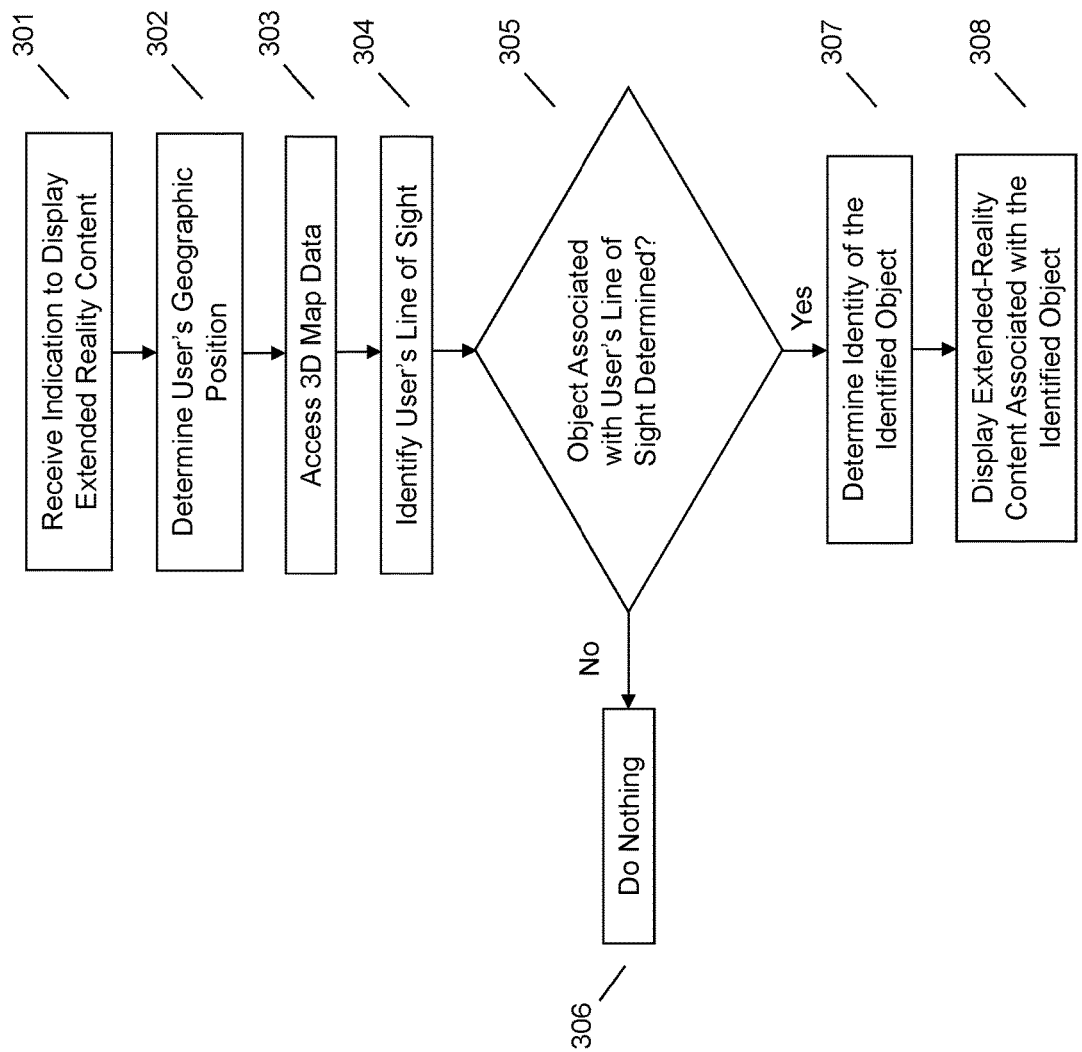
FIG. 3 illustrates an example method of displaying informative XR-content associated with an object in a user's field of view.

Referring now to FIG. 3, an embodiment may accurately identify an object a user is looking at and thereafter provide information about that object on an extended reality capable display. At 301, an embodiment may receive an indication to display extended reality ("XR") content related to an object in a user's field of view. In the context of this application, XR-content may refer to augmented reality ("AR") content, mixed reality ("MR") content, a combination thereof, and the like. The content may be displayed on one or more displays of an XR-capable device (e.g., a smart phone or tablet capable of displaying XR content on a display screen of a device, a head-mounted display (HMD) capable of displaying content on a transparent, or semi-transparent, visor or display lens, etc.). In the context of this application, the user's field of view may correspond to the observable area a user may be able to see through their eyes or through a transparent, or semi-transparent, screen/lens associated with a device. For simplicity purposes, the majority of the discussion herein will involve AR content displayed on an AR-HMD. However, it should be understood that such a generalization is not limiting and any XR-capable device may be utilized to execute the processes of the underlying application.

In an embodiment, the object may be virtually any outdoor object that location data can be obtained for such as a building, statue, monument, artistic structure, park, and the like. In an embodiment, the content may comprise information about an object. For example, the information may be historical information, structural information, trivia information, etc. For instance, an embodiment may be able to identify when a structure was built, by who it was built, the type of structure it is, a major event that occurred at the structure, other information about the structure, etc.

In an embodiment, the indication may be associated with a user-provided command to display content. The command may be detected at an input device (e.g., an audio capture device, an image and/or video capture device, physical or digital keyboard, a touch screen, etc.) and may be provided by any known method of providing a command (e.g., touch input, voice input, gesture input, etc.). As a non-limiting example, a user may perform a pointing gesture at an object they are looking. Recognition of this gesture may provide an indication to the device to begin the content display process. In another non-limiting example, a user may provide a verbal expression comprising one or more words or phrases that a system may recognize as being associated with content display. For instance, a user may say "what's that?", "tell me about that", "I don't know what that is", etc. In another embodiment, the indication may be created responsive to the device identifying an object. For example, a user may be running an object identifying application that may be configured to automatically output content associated with the object responsive to positively identifying the object.

In order to display information about an object, an embodiment must first identify the object a user is interested in receiving information about and thereafter identify what the object is. An embodiment may accomplish this by acquiring three different types of information: a user's geographic position, map data associated with a user's geographic area, and line-of-sight data identifying a gaze direction of the user.

At 302, an embodiment may determine a user's geographic position in an area. This determination may be accomplished, for example, by receiving Global Positioning System (GPS) data from one or more GPS receivers integrated into the user's device. Alternatively, GPS data may be received from other devices that are associated with a user. For example, an embodiment may receive GPS data from a user's smart watch, smart phone, other wearable electronic device, a combination thereof, etc. In another embodiment, a user's geographic position may be identified based upon data received from other, non-user devices identified as being associated with the user's position. For example, an embodiment may access social media data to identify that another user has just tagged the user as being present in a particular location. Other conventional location identification methods may also be utilized such as geolocation, radiolocation, and other conventional types of position tracking methods utilized by various other positioning systems. The aforementioned determination methods may be used alone or in combination. For example, an embodiment may utilize more than one determination method in order to obtain confirmation, or higher confidence, in their location identification determination.

At 303, an embodiment may access map data associated with the area. In an embodiment, the map data may be three-dimensional (3D) map data that may comprise accurate location information for all objects encompassed in the area. In an embodiment, the map data that is accessed and/or utilized may correspond to map data a predetermined distance around a user's geographic position. For example, an embodiment may access map data for all objects located: 500 feet around a user, 1 square mile around a user, in the city a user is identified as being located in, etc. The amount of map data accessed/utilized may be set by a manufacturer and/or adjusted by a user. In an embodiment, the map data may be accessed from an accessible storage location. The accessible storage location may be stored locally, on the device, or may be stored remotely (e.g., on another device, on another server, etc.) and accessed by the device using a wireless connection.

At 304, an embodiment may identify a user's line of sight. In this regard, an embodiment may identify a gaze direction and a gaze point of the user. In an embodiment, one or more sensors may be integrated into the device that may be able to identify both of these data points. For instance, with respect to the gaze direction, an embodiment may comprise a gyroscopic compass that may be able to identify a direction that a user is facing. Additionally or alternatively, an embodiment may obtain information from a navigation and/or a map application that is able to make this determination. With respect to the gaze point, an embodiment may utilize conventional eye-tracking processes to identify a point in the user's field of view they are looking at. With these two combined pieces of information, an embodiment may be able to identify the direction a user is oriented and a point in that direction the user is looking at.

At 305, an embodiment may determine an object associated with the user's gaze. An embodiment may make this determination, for example, by first utilizing the location data to identify a user's position in geographic space. An embodiment may then access map data associated with the user's position to identify all of the objects surrounding a user. An embodiment may thereafter determine a user's line of sight by identifying a user's gaze direction and gaze point. With all data points obtained, an embodiment may be able to identify the object a user is looking at. For example, an embodiment may be able to identify where a line representative of a user's line of sight intersects with an object in the map data. It is important to note that although the obtainment of map data was described first, this step does not always need to occur prior to the determination of a user's line of sight. Stated differently, an embodiment may determine a user's line of sight prior to obtaining map data. Alternatively, an embodiment may procure both pieces of information substantially simultaneously.

Responsive to not determining, at 305, the object associated with the gaze direction, an embodiment may, at 306, do nothing. Alternatively, an embodiment may output a notification to the user (e.g., an audible notification, a visual notification, etc.) that an object could not be accurately identified. Conversely, responsive to determining the object associated with the user's line of sight, an embodiment may, at 307, identify what the object actually is. In an embodiment, map data may comprise object identity information for all objects in the user's area. Accordingly, an embodiment may determine an object's identity by identifying the object associated with the user's line of sight and thereafter obtaining the name for that object from the map data. In another embodiment, the user's device may capture an image of the object that may subsequently be provided into an image-based search engine that may be able to determine the object's identity. Responsive to determining the object's identity, an embodiment may also be able to access additional information about the object by referring to a data store accessible to the device (e.g., stored locally, available on a website online, etc.).

At 308, an embodiment may display content associated with the object in a field of view of the device. In an embodiment, the content may be virtually any type of content that is able to be visualized by a user. For example, the content may comprise text, colors, graphics, animations, a combination of the foregoing, and the like. In an embodiment, content may be displayed on one or more portions of the display such as a central portion, a peripheral portion, other portions, etc. For example, in a situation where historical information was being provided to the user about a building, an embodiment may display text on portions of the display that do not obstruct a user's view of the building. Alternatively, in a similar situation, an embodiment may be able to display content overtop a display portion of the object. For example, an embodiment may be able to identify the boundaries of a building and thereafter adjust the font size, borders, and position of an augmented text block to conform to the dimensions and display position of the building. In a situation where an object occupies all, or a majority of, the display field of view (e.g., because it is large and close to a user, etc.), an embodiment may display content on a predetermined portion of the display according to a policy. For example, an embodiment may display content on a periphery of the display so as not to interfere with a user's field of view. An embodiment may also be able to visually distinguish a portion of the object. For example, if an important event happened on the $22^{nd}$ floor of a 50 story building, an embodiment may highlight (e.g. in a predetermined color, etc.) the entire floor, provide a visual indicator of the floor (e.g., an arrow pointing to the floor-of-interest, etc.).

The various embodiments described herein thus represent a technical improvement to conventional object-of-interest identification techniques. Using the techniques described herein, an embodiment may receive an indication to display extended reality content in a user's field of view. An embodiment may then determine an object associated with a user's line of sight by: identifying a user's geographic position in an area, accessing high quality map data, and identifying a user's line of sight. Responsive to determining the object associated with the user's line of sight, an embodiment may determine an identity of the object and thereafter display content associated with that object in a field of view of the user's device. Such a method may more accurately identify an object a user is interested in receiving additional information about.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, an indication to display extended reality content on a display;
determining, using a processor, a user's geographic position in an area;
accessing, from an accessible storage location, map data associated with the area;
identifying, using at least one sensor associated with the information handling device, a user's line of sight;
determining, based on the user's geographic position and the map data, an object associated with the user's line of sight, wherein the object is a real-world, non-interactive object;
determining, using a processor, an identity of the object;
obtaining additional information associated with the identified object; and
displaying, as the extended-reality content, the additional information on the display of the information handling device, wherein the displaying comprises adjusting at least one display parameter of the extended-reality content so that the additional information is displayed only within a portion of the display that corresponds to boundaries associated with the identified object.

2. The method of claim 1, wherein the receiving the indication comprises receiving a user command to display extended reality content.

3. The method of claim 1, wherein the extended reality content comprises content selected from the group consisting of augmented reality content and mixed reality content.

4. The method of claim 1, wherein the information handling device is associated with at least one of: a head-mounted wearable device and a hand-held smart device.

5. The method of claim 1, wherein the determining the user's geographic position in the area comprises determining using global positioning system (GPS) data.

6. The method of claim 1, wherein the object is selected from the group consisting of a building, a statue, an artistic structure, and a monument.

7. The method of claim 1, wherein the identifying the user's line of sight comprises identifying a gaze direction and a gaze point of the user.

8. The method of claim 1, wherein the displaying comprises visually distinguishing, in the field of view, a portion of the object associated with the content.

9. An information handling device, comprising:
at least one sensor;
a processor;
a memory device that stores instructions executable by the processor to:
receive an indication to display extended reality content on a display of the information handling device;
determine a user's geographic position in an area;
access, from an accessible storage database, map data associated with the area;
identify a user's line of sight;
determine, based on the user's geographic position and the map data, an object associated with the user's line of sight, wherein the object is a real-world, non-interactive object;
determine an identity of the object;
obtain additional information associated with the identified object; and
display, as the extended-reality content, the additional information on the display of the information handling device, wherein the displaying comprises adjusting at least one display parameter of the extended-reality content so that the additional information is displayed only within a portion of the display that corresponds to boundaries associated with the identified object.

10. The information handling device of claim 9, wherein the instructions executable by the processor to receive the indication comprise instructions executable by the processor to receive a user command to display extended reality content.

11. The information handling device of claim 9, wherein the extended reality content comprises content selected from the group consisting of augmented reality content and mixed reality content.

12. The information handling device of claim 9, wherein the information handling device is associated with at least one of: a head-mounted wearable device and a hand-held smart device.

13. The information handling device of claim 9, wherein the instructions executable by the processor to determine the user's geographic position in the area comprise instructions executable by the processor to determine using global positioning system (GPS) data.

14. The information handling device of claim 9, wherein the object is selected from the group consisting of a building, a statue, an artistic structure, and a monument.

15. The information handling device of claim 9, wherein the instructions executable by the processor to identify the user's line of sight comprise instructions executable by the processor to identify a gaze direction and a gaze point of the user.

16. The information handling device of claim 9, wherein the instructions executable by the processor to display comprise instructions executable by the processor to visually distinguish, in the field of view, a portion of the object associated with the content.

17. A product, comprising:
 a storage device that stores code, the code being executable by a processor and comprising:
 code that receives an indication to display extended reality content on a display;
 code that determines a user's geographic position in an area;
 code that accesses map data associated with the area;
 code that identifies a user's line of sight;
 code that determines, based on the user's geographic position and the map data, an object associated with the user's line of sight, wherein the object is a real-world, non-interactive object;
 code that determines an identity of the object;
 code that obtains additional information associated with the identified object and code that displays the extended reality content for the identified object on the display, wherein the code that displays comprises code that adjusts at least one display parameter of the extended-reality content so that the additional information is displayed only within a portion of the display that corresponds to boundaries associated with the identified object.

* * * * *